(12) United States Patent
Salotto

(10) Patent No.: US 12,466,153 B2
(45) Date of Patent: Nov. 11, 2025

(54) TEAR-OFF DEVICE FOR APPLYING LABELS OR FASTENERS

(71) Applicant: FRAMIS ITALIA S.P.A., Gaggiano (IT)

(72) Inventor: Francesca Manuela Sara Salotto, Gaggiano (IT)

(73) Assignee: FRAMIS ITALIA S.P.A., Gaggiano (IT)

( * ) Notice: Subject to any disclaimer, the term of this patent is extended or adjusted under 35 U.S.C. 154(b) by 178 days.

(21) Appl. No.: 18/571,890

(22) PCT Filed: Jul. 6, 2022

(86) PCT No.: PCT/IB2022/056246
§ 371 (c)(1),
(2) Date: Dec. 19, 2023

(87) PCT Pub. No.: WO2023/285924
PCT Pub. Date: Jan. 19, 2023

(65) Prior Publication Data
US 2024/0277118 A1    Aug. 22, 2024

(30) Foreign Application Priority Data

Jul. 14, 2021  (IT) .................. 102021000018584

(51) Int. Cl.
*B32B 3/06* (2006.01)
*B32B 27/40* (2006.01)

(52) U.S. Cl.
CPC .............. *B32B 3/06* (2013.01); *B32B 27/40* (2013.01); *B32B 2250/05* (2013.01); *B32B 2375/00* (2013.01); *B32B 2451/00* (2013.01)

(58) Field of Classification Search
CPC ....... B32B 3/06; B32B 27/40; B32B 2250/05; B32B 2375/00; B32B 2451/00
USPC .......................................................... 428/99
See application file for complete search history.

(56) References Cited

U.S. PATENT DOCUMENTS

| 5,436,051 | A | * | 7/1995 | Donaruma | D06N 3/0093 428/95 |
| 2004/0001957 | A1 | * | 1/2004 | Seita | B32B 15/08 428/457 |
| 2004/0053562 | A1 | * | 3/2004 | Petroski | B24B 37/20 451/538 |
| 2007/0186327 | A1 | | 8/2007 | Hall et al. | |
| 2021/0100386 | A1 | * | 4/2021 | Quiet | A47G 27/0231 |
| 2024/0277118 | A1 | * | 8/2024 | Salotto | A44B 18/0073 |

FOREIGN PATENT DOCUMENTS

| DE | 60013291 T2 | 8/2005 |
| WO | 2019021937 A1 | 1/2019 |

OTHER PUBLICATIONS

International Search Report for International Patent Application No. PCT/IB2022/056246, mailed Oct. 4, 2022.

* cited by examiner

*Primary Examiner* — Betelhem Shewareged
(74) *Attorney, Agent, or Firm* — CANTOR COLBURN LLP

(57) ABSTRACT

A hook-and-loop type tear-off device having a first part with loop elements and a second part with hook elements is provided. A first multi-layer adhesive is hot-applied to the first part, the first multi-layer adhesive having an inner layer and an outer layer made of thermoplastic polyurethane.

13 Claims, 3 Drawing Sheets

TEAR-OFF DEVICE FOR APPLYING LABELS OR FASTENERS

CROSS-REFERENCE TO RELATED APPLICATIONS

This application is a National Phase Application of PCT International Application PCT/IB2022/056246, having an International Filing Date of Jul. 6, 2022 which claims priority to Italian Application No. 102021000018584 filed Jul. 14, 2021, each of which is hereby incorporated by reference in its entirety.

FIELD OF THE INVENTION

The present invention relates to a hook-and-loop-type tear-off device having various uses, such as for applying removable labels to a garment or for making a fastener, for example, for a jacket or coat or a medical prosthesis.

BACKGROUND OF THE INVENTION

Hook-and-loop fasteners, mainly known by the trade name Velcro®, are widely used in countless industries. They consist of a first part provided with an inner face on which countless loops are distributed and a second part provided with an inner face on which countless hooks are distributed; by exerting pressure between the two parts, the engagement between the hooks and the loops is achieved.

One of the two parts, usually the part bearing the loops, is attached, usually by stitching, to a support comprised, for example, of a garment so as to make a connection strong enough to withstand the sometimes-vigorous action required to separate it from the part bearing the hooks.

However, it was found that the need to attach the device to the support by stitching is actually a limitation to the shapes of said device, since some shapes, for example those having sharp regions, could not be stitched according to the usual techniques. For some applications, moreover, the presence of seams makes use uncomfortable, as in the case of some prostheses, where the reverse side of the seams is in contact with the user's skin.

SUMMARY OF THE INVENTION

It is the object of the present invention to provide a hook-and-loop-type tear-off device that meets the needs of the industry and overcomes the drawbacks discussed above with reference to the prior art.

Such object is achieved by a tear-off device as described and claimed herein. Advantageous embodiments of the present invention are also described.

BRIEF DESCRIPTION OF THE FIGURES

The features and advantages of the tear-off device according to the present invention will be apparent from the description below, given by way of non-limiting example according to the figures in the attached drawings, wherein.

DETAILED DESCRIPTION

Figure 2:
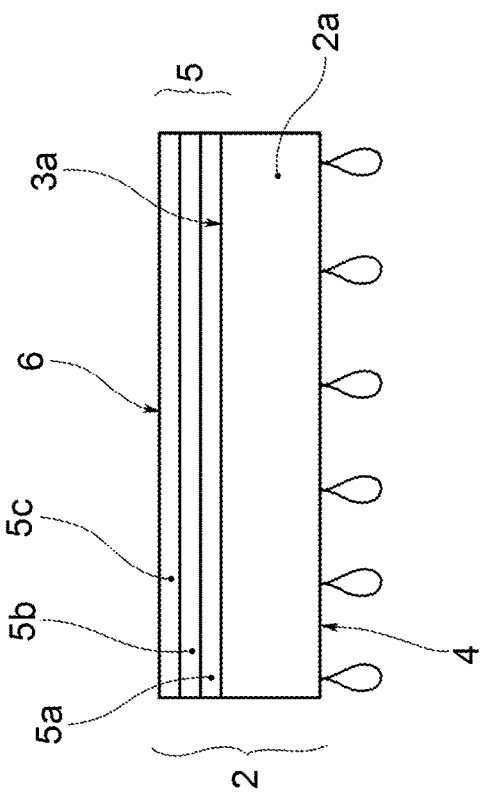
FIG. 2 shows a first part of the tear-off device in FIG. 1.

With reference to the figures in the attached drawings, 1 has been used to denote as a whole a hook-and-loop-type tear-off device usable for applying removable labels to a garment or for making a fastener, such as for a jacket, a coat, or a medical prosthesis.

The tear-off device 1 comprises a first part 2 having an inner face 4 and an outer face 6; the first part 2 comprises a plurality of loop elements 8 distributed on the inner face 4. The tear-off device 1 further comprises a second part 10 having an inner face 12, facing the inner face 4 of the first part 2, and an outer face 14; the second part 10 comprises a plurality of hook elements 16 distributed on the inner face 12.

By pressing the second part 10 on the first part 2, the hook elements 16 engage with the loop elements 8, forming a tear-off connection.

The first part 2 comprises a substrate 2a bearing the inner face 4, having an opposite surface 3a on which a nitryl-based film is distributed. A first adhesive 5 is applied to the surface 3a, preferably by a hot process, such as by hot lamination, said adhesive comprising an inner layer 5a adhering to the substrate 2a via the nitryl-based film, an outer layer 5c, bearing the outer face 6, and an intermediate layer 5b, placed between the inner layer 5a and the outer layer 5c and adhering thereto.

The inner layer 5a is mainly made of thermoplastic polyurethane (TPU); the intermediate layer is mainly made of high-melting thermoplastic polyurethane (i.e., with softening point at about 140° C.); the outer layer 5c is mainly made of thermoplastic polyurethane (TPU).

Figure 3:
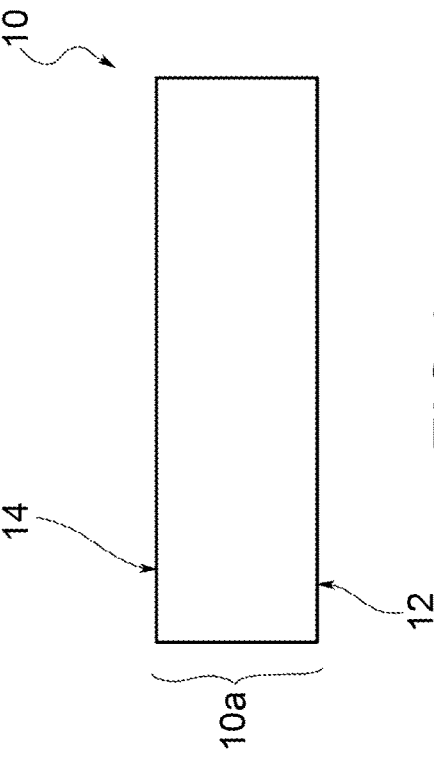
FIG. 3 shows a second part of the tear-off device, according to an embodiment of the present invention.
Figure 5:
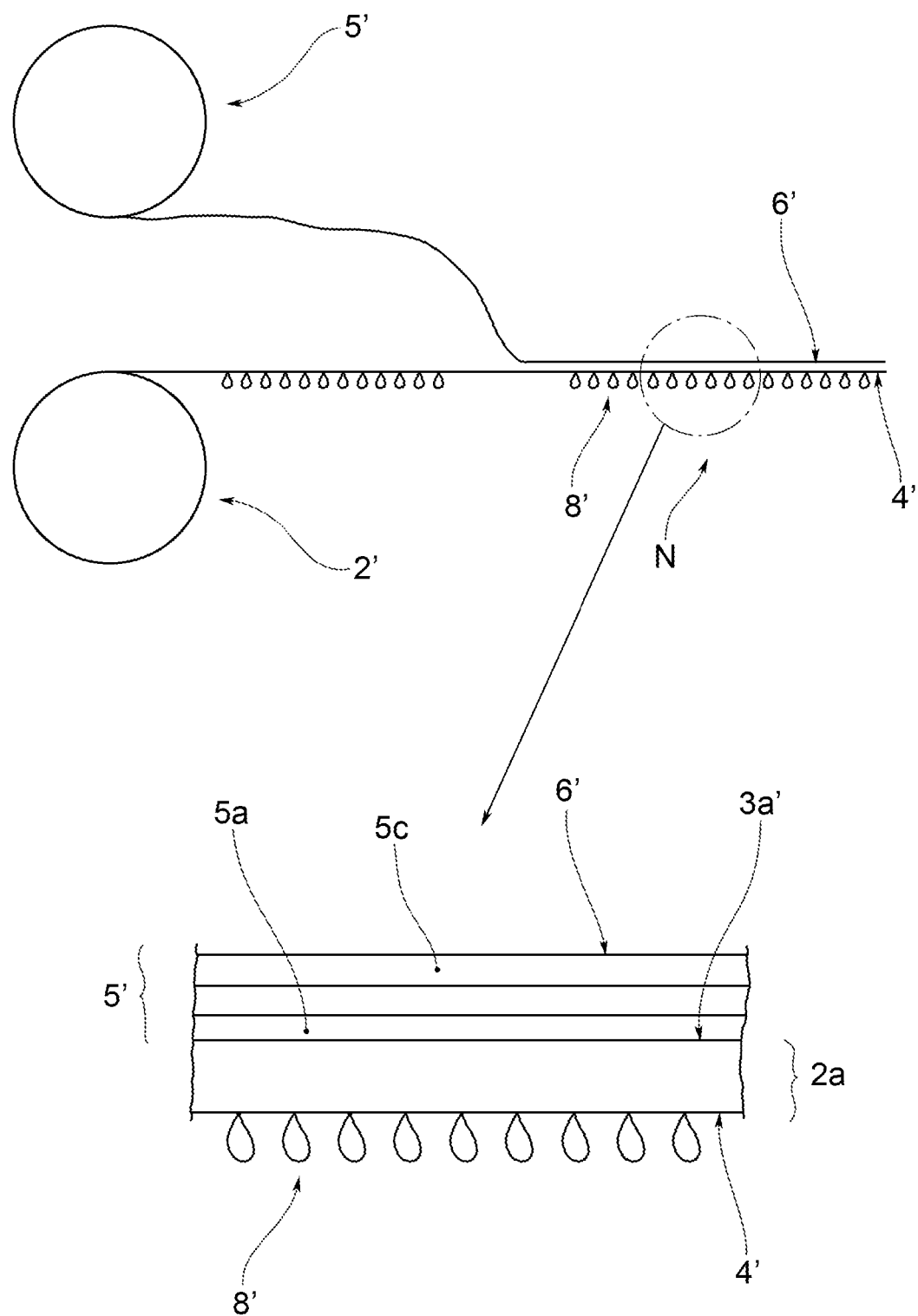
FIG. 5 shows schematically a method for making a female strip from which the first part of the tear-off device is made.
Figure 6A:
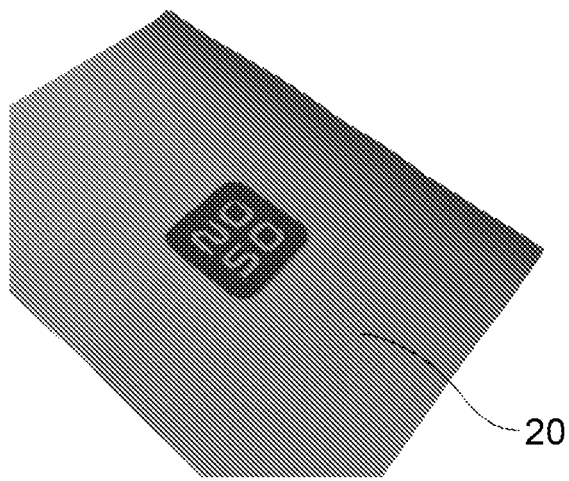
FIG. 6a through 6d show some examples of the application of the tear-off device according to the present invention.
Figure 6B:
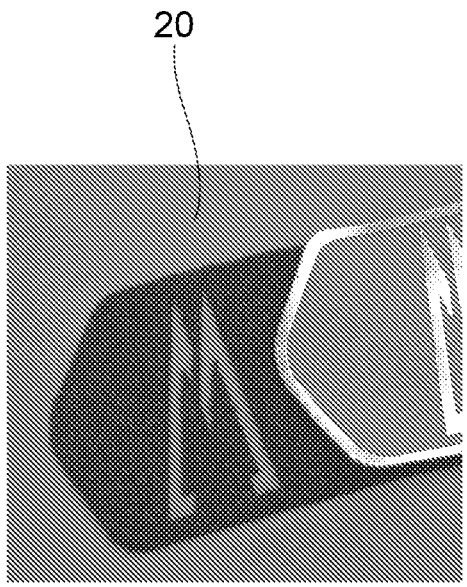
Figure 6C:
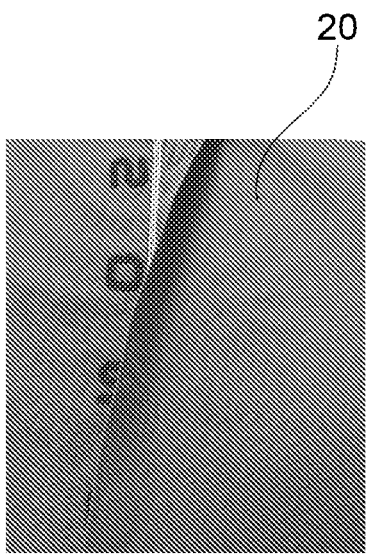
Figure 6D:
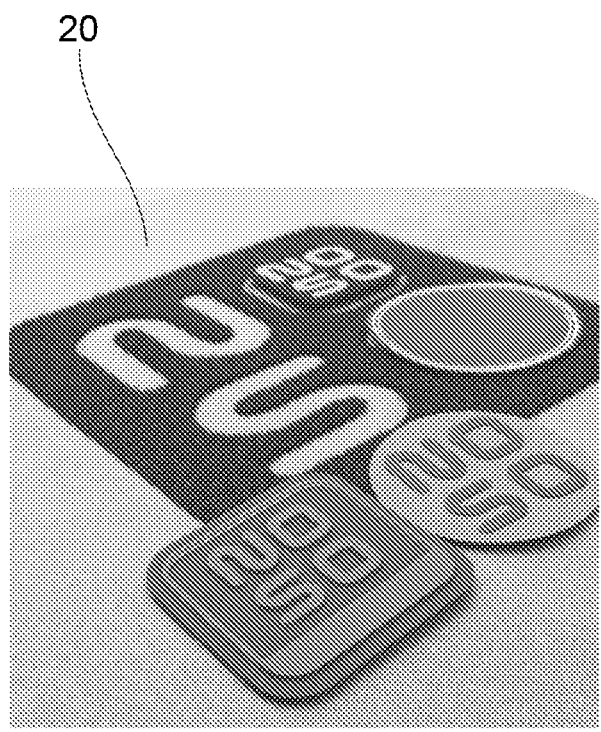

According to a first embodiment of the invention (FIG. 3), the second part 10 is entirely comprised of a substrate 10a, bearing the inner face 12 and the outer face 14.

Figure 4:
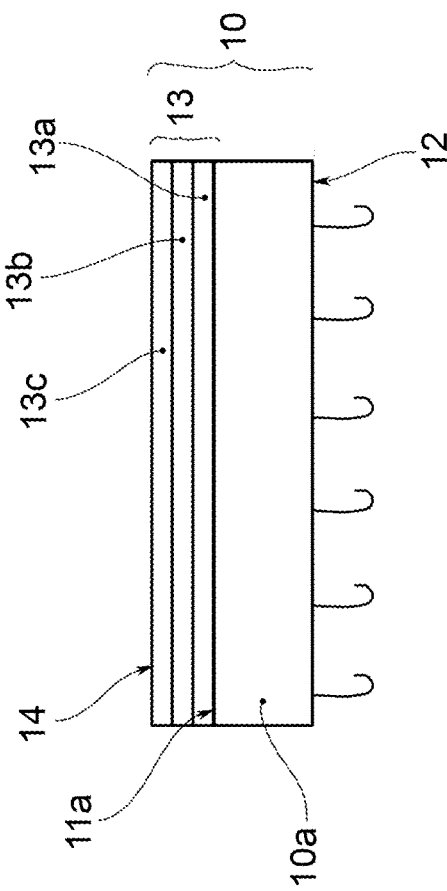
FIG. 4 shows a second part of the tear-off device, according to a further embodiment of the present invention.
Figure 1:
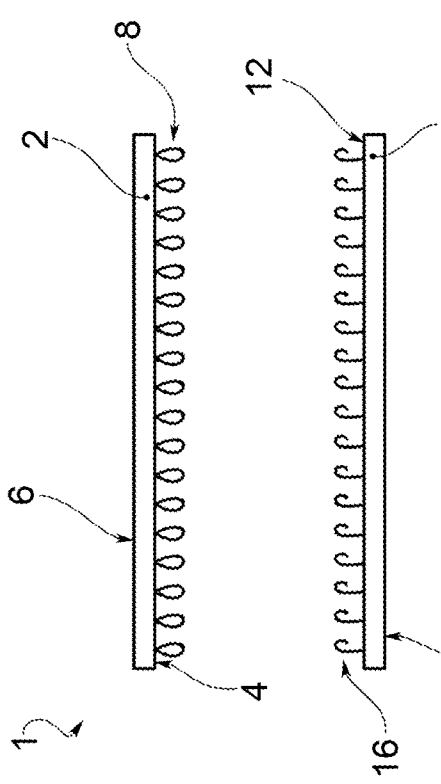
FIG. 1 shows a tear-off device according to an embodiment of the present invention.

According to a further embodiment (FIG. 4), the second part 10 comprises a substrate 10a bearing the inner face 12, having an opposite surface 11a on which a nitryl-based film is distributed. A second adhesive 13 is applied to the surface 11a, preferably by a hot process, such as by hot lamination, said second adhesive comprising an inner layer 13a adhering to the substrate 10a by means of the nitryl-based film, an outer layer 13c bearing the outer face 14, and an intermediate layer 13b, placed between the inner layer 13a and the outer layer 13c and adhering thereto.

The inner layer 13a is mainly made of thermoplastic polyurethane (TPU); the intermediate layer is mainly made of high-melt thermoplastic polyurethane; the outer layer 13c is mainly made of thermoplastic silicone (TPU).

Said adhesive 5, 13 is activated by heat, such as through hot pressing operations or ultrasonic welding.

Consequently, the first part 2 or, when provided, the second part 10 of the tear-off device 1 are applicable to a support 20 for example to a garment or medical prosthesis by bonding by the action of said adhesive 5, 13.

Advantageously, this allows for seams to be eliminated, particularly in embodiments where high comfort is important, such as in the case of medical prostheses where the reverse side of the seams may be in contact with the patient's skin, or in embodiments where a particular aesthetic effect is desired, such as in the case of hook-and-loop tear-off fasteners for jackets or coats, by avoiding visible seams.

According to a further use, the first part 2 or the second part 10 of the tear-off device 1 constitutes a label, for example depicting a brand name, a logo, writing, or a printed image, intended to be applied to a support such as a portion of a garment, especially sportswear. For example, the support is mainly made of natural fibers (e.g., cotton, linen, wool, and the like) or synthetic fibers (e.g., polyester, polyamide, PVC) or leather or artificial leather.

For this purpose, the first part 2 and/or the second part 10 of the tear-off device 1 is shaped to reproduce the desired logo; for example, said parts 2, 10 are shaped by laser cutting or blade cutting or by die cutting.

For the industrial production of the first part 2 of the tear-off device 1, first a female strip N is made, then cut and shaped as needed.

Specifically, a method for making the female strip N comprises the following steps:
providing a first strip 2' having an inner face 4' and an outer face 6' and bearing a plurality of loop elements 8' distributed on the inner face 4', where the first strip 2' comprises a substrate 2a bearing the inner face 4', having an opposite surface 3a' on which a film is distributed or on which a nitryl-based treatment or finishing is performed;
hot-applying to the first strip 2' a first multi-layer adhesive strip 5' comprising an inner layer 5a made mainly of thermoplastic polyurethane adhering to the substrate 2a via the nitryl-based film and an outer layer 5c mainly made of thermoplastic polyurethane bearing the outer face 6'.

Preferably, the application of the first adhesive strip 5' to the first strip 2' is done by hot lamination.

Next, at least one portion of the female strip N is cut and shaped, for example, by means of laser cutting or blade cutting or by die cutting.

According to a variant embodiment of the tear-off device 1, the outer face 6, 14 of the first part 2 and/or the second part 10 bears a print, made, for example, by screen printing, digital printing, silicone printing, or injection printing.

According to one embodiment of the present invention, a kit comprises a single first part 2 and a plurality of second parts 10 that are interchangeably applicable to said first part 2, where each second part 10 is distinguishable from another second part, for example, by shape or printing.

Advantageously, this allows for the garment to which the label is applied to be customized, as it is possible to remove a second part and replace it with another, for example, of a different color or different shape or print.

According to a variant embodiment, the first part of the tear-off device bears the hook elements and the second part bears the loop elements.

Innovatively, the tear-off device according to the present invention meets the needs of the industry and overcomes the drawbacks mentioned above, as it avoids the use of stitching, for example, for comfort or aesthetic requirements.

It is clear that those skilled in the art may make changes to the tear-off device described above in order to meet incidental needs, all falling within the scope of protection defined in the following claims.

The invention claimed is:

1. A tear-off device of the hook-and-loop type, applicable to a support for making a tear-off label or closure, comprising:
   a first part comprising an inner face and an outer face and bearing a plurality of loop elements distributed on the inner face;
   a second part comprising an inner face facing the inner face of the first part, and an outer face, bearing a plurality of hook elements distributed on the inner face, said loop elements and said hook elements being engageable for making a releasable tear-off connection;
   wherein the first part further comprises a substrate bearing the inner face, having an opposite surface on which a nitryl-based film is distributed or on which a nitryl-based finishing or treatment is made and to which a first multi-layer adhesive is hot applied, the first multi-layer adhesive comprising an inner layer mainly made of thermoplastic polyurethane adhering to the substrate and an outer layer mainly made of thermoplastic polyurethane bearing the outer face.

2. The tear-off device of claim 1, wherein the first multi-layer adhesive further comprises an intermediate layer, placed between the inner layer and the outer layer, mainly made of high-melting polyurethane and adhering to the inner and outer layers.

3. The tear-off device of claim 1, wherein the second part is entirely made of a substrate bearing the inner face and the outer face.

4. The tear-off device of claim 1, wherein the second part further comprises a substrate bearing the inner face, having an opposite surface on which a nitryl-based film is distributed or on which a nitryl-based finishing or treatment is made and to which a second multi-layer adhesive is hot-applied, the second multi-layer adhesive comprising an inner layer mainly made of thermoplastic polyurethane adhering to the substrate and an outer layer mainly made of thermoplastic polyurethane bearing the outer face.

5. The tear-off device of claim 4, wherein the second multi-layer adhesive further comprises an intermediate layer, placed between the inner layer and the outer layer, mainly made of high-melting polyurethane and adhering to the inner and outer layers.

6. The tear-off device of claim 1, wherein said first multi-layer adhesive is activable by heat.

7. An assembly comprising:
   the tear-off device of claim 1; and
   a support;
   wherein the outer face of the first part of the tear-off device is hot-applied to the support by said first multi-layer adhesive.

8. A female strip for a tear-off device of the hook-and-loop type, comprising an inner face and an outer face and bearing a plurality of loop elements distributed on the inner face, the female strip further comprising a substrate bearing the inner face and having an opposite surface on which a nitryl-based film is distributed or on which a nitryl-based finishing or treatment is made and a first multi-layer adhesive strip, wherein the first multi-layer adhesive strip comprises an inner layer mainly made of thermoplastic polyurethane adhering to the substrate and an outer layer mainly made of thermoplastic polyurethane bearing the outer face.

9. A method for making a female strip for a tear-off device, the method comprising:
   providing a first strip comprising an inner face and an outer face and bearing a plurality of loop elements distributed on the inner face, wherein the first strip further comprises a substrate bearing the inner face, having an opposite surface on which a nitryl-based film is distributed or on which a nitryl-based finishing or treatment is made;
   hot applying to the first strip a first multi-layer adhesive strip, the first multi-layer adhesive strip comprising an inner layer mainly made of thermoplastic polyurethane adhering to the substrate and an outer layer mainly made of thermoplastic polyurethane bearing the outer face.

10. The method of claim 9, wherein application of the first multi-layer adhesive strip to the first strip takes place by hot-rolling.

11. The method of claim 9, wherein at least a portion of the female strip is shaped by laser cutting, blade cutting or die-cutting.

12. The tear-off device of claim 4, wherein said second multi-layer adhesive is activable by heat.

13. The assembly of claim 7, wherein the support is a fabric.

* * * * *